Figure 2:
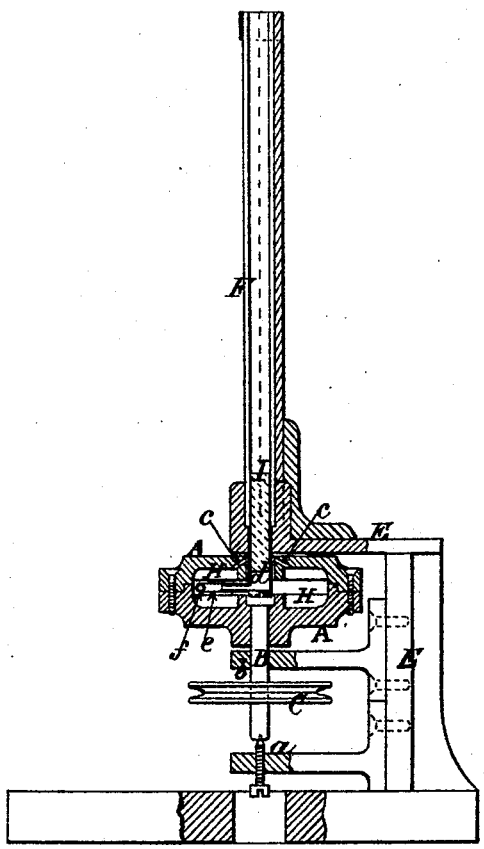

7 Sheets—Sheet 1.

J. M. NAPIER.
SPEED-INDICATOR.

No. 184,653. Patented Nov. 21, 1876.

WITNESSES:
Wm. A. Skinkle.
Geo. W. Beck.

INVENTOR:
James M. Napier
By his Attorneys,
Baldwin, Hopkins & Peyton

7 Sheets—Sheet 2.
J. M. NAPIER.
SPEED-INDICATOR.
No. 184,653. Patented Nov. 21, 1876.
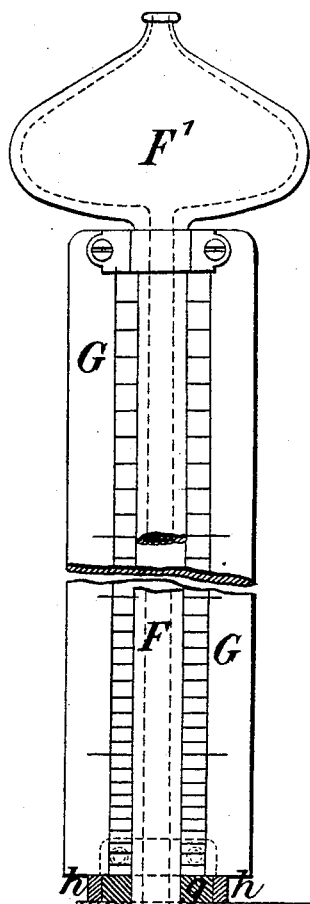
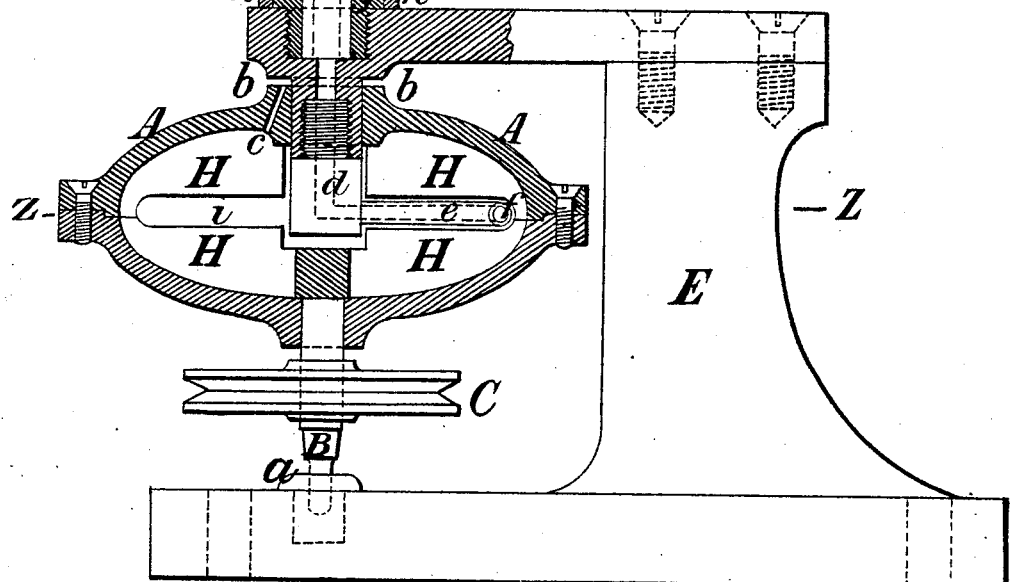
Fig: 4.
WITNESSES:
Wm A Skinkle
Geo. W. Breck.
INVENTOR:
James M. Napier
By his Attorneys,
Baldwin, Hopkins & Peyton J. M. NAPIER.
SPEED-INDICATOR.
No. 184,653. Patented Nov. 21, 1876.
Fig: 5.
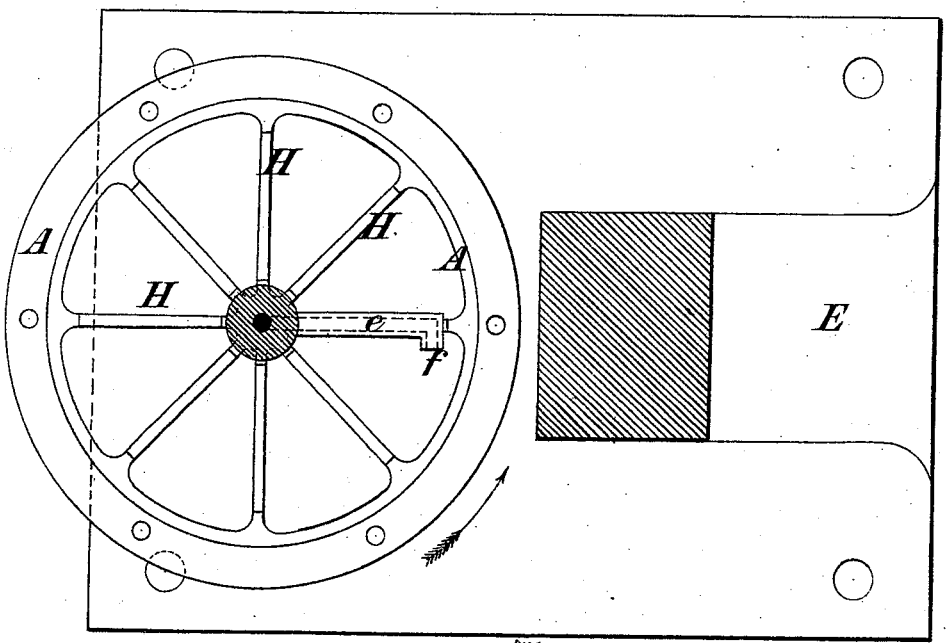
Fig: 7.
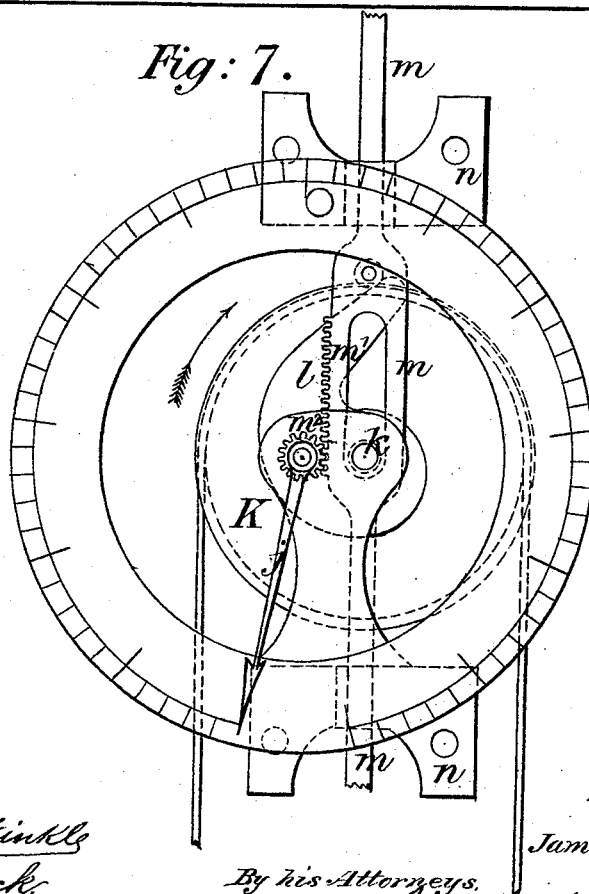
WITNESSES:
Wm A. Skinkle
Geo. W. Beck
INVENTOR:
James M. Napier
By his Attorneys,
Baldwin Hopkins & Peyton

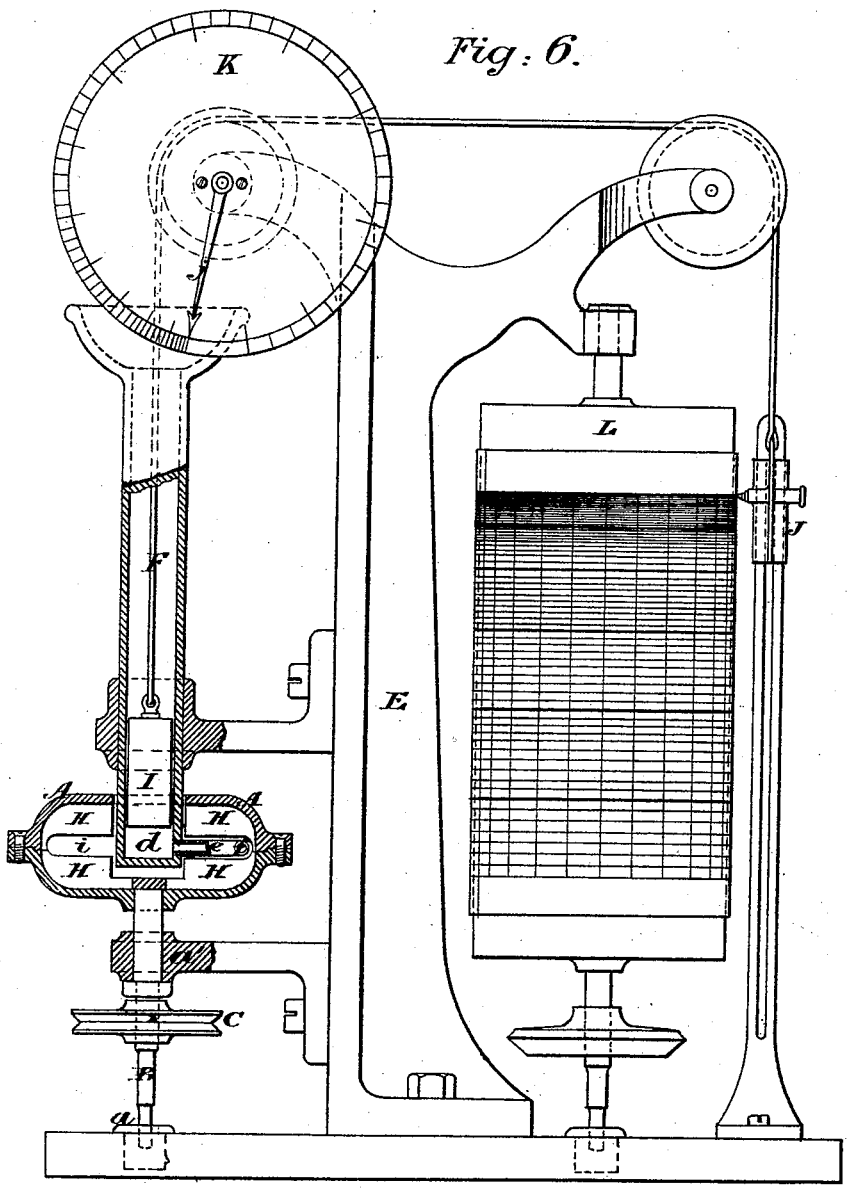

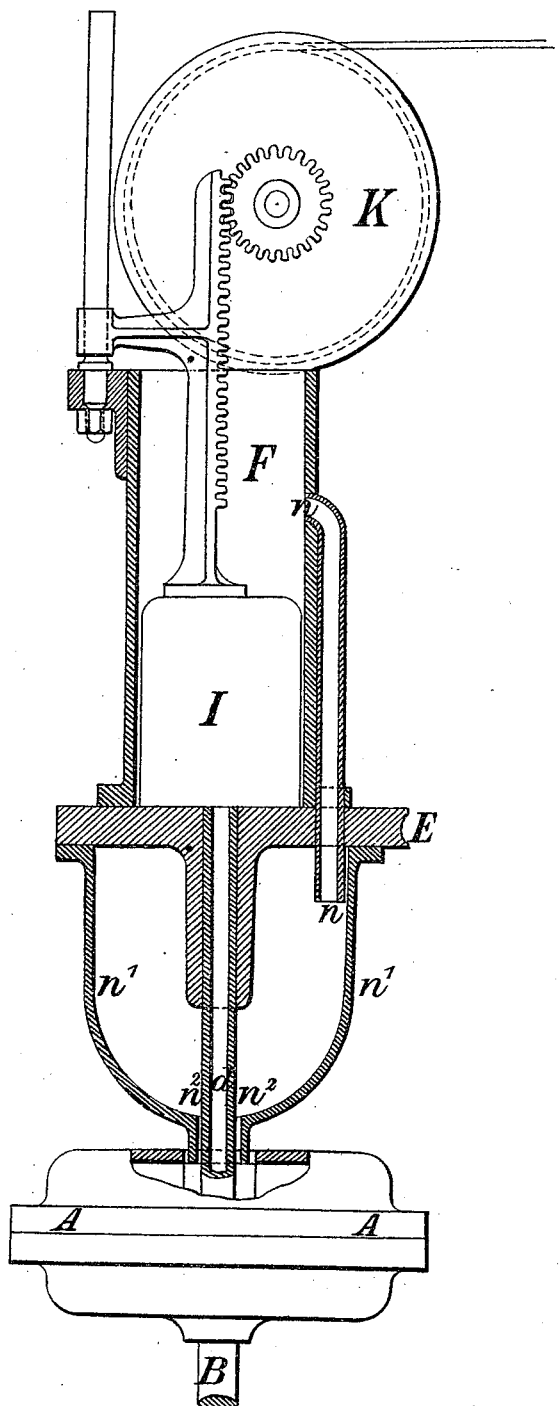

J. M. NAPIER.
SPEED-INDICATOR.
No. 184,653. Patented Nov. 21, 1876.
7 Sheets—Sheet 6.
Fig: 9.
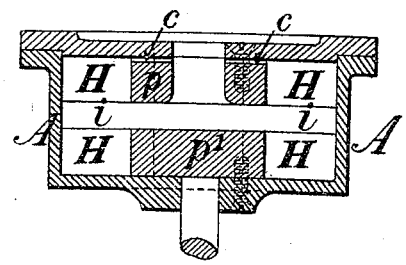
Fig: 10.
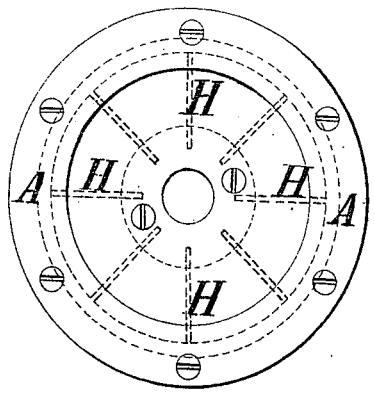
Fig: 11.
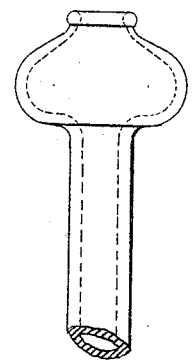
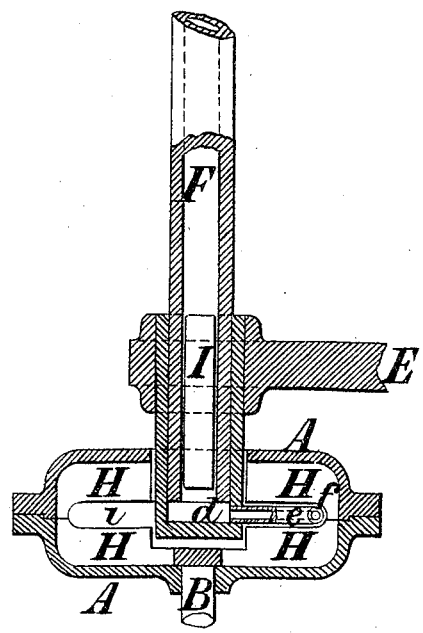
WITNESSES:
Wm A. Skinkle
Geo. W. Breck.
INVENTOR:
James M. Napier
By his Attorneys,
Baldwin Hopkins & Peyton.

7 Sheets—Sheet 7.
J. M. NAPIER.
SPEED-INDICATOR.
No. 184,653. Patented Nov. 21, 1876.
Fig: 12.
Fig: 14.
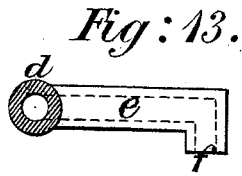
Fig: 13.
Fig: 15.
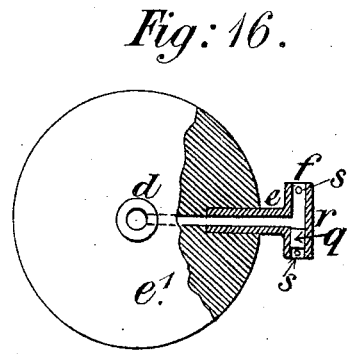
Fig: 16.
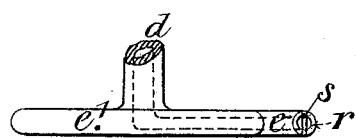
Fig: 17.
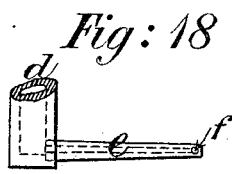
Fig: 18.
Fig: 19.
WITNESSES
Wm. A. Skinkle
Geo. W. Peck.
INVENTOR:
James M. Napier.
By his Attorneys,
Baldwin, Hopkins & Peyton

UNITED STATES PATENT OFFICE.

JAMES M. NAPIER, OF LAMBETH, ENGLAND.

IMPROVEMENT IN SPEED-INDICATORS.

Specification forming part of Letters Patent No. 184,653, dated November 21, 1876; application filed October 7, 1876.

*To all whom it may concern:*

Be it known that I, JAMES MURDOCH NAPIER, of York Road, Lambeth, in the county of Surrey, England, have invented new and useful Improvements in Speed-Indicators, which improvements are fully set forth in the following specification, reference being had to the accompanying drawings.

This invention has for its object improvements in speed-indicators for exhibiting the rate of motion or number of revolutions being made (say, per minute) by a shaft, spindle, wheel, pulley, or other such rotary body, and by marine, locomotive, and stationary engines, and, generally, by engines, machinery, carriages, and instruments which have rotary parts, or moving parts from which a rotary action can be obtained.

I employ a vessel formed to contain a suitable fluid, mounted on a spindle, or in bearings or supports, so that it can be easily rotated. The vessel is rotated by being placed in connection, through suitable pulleys and band, toothed gear, or other convenient means, with the rotating body, engine, machine, or instrument the speed of which it is desired to indicate, and the fluid, when placed within it, rotates with it. I provide a fixed tube or vessel, supported by a suitable frame or bracket. The lower portion of this tube or vessel passes into the rotating vessel at its upper end, and at or near its axis. From this fixed tube or vessel a hollow arm projects, and terminates near the inner circumference of the rotating vessel, but not touching it. In this hollow arm, at or near its extremity, is an orifice, through which the fluid in the rotating vessel finds its level in the stationary tube or vessel. The orifice referred to is so placed that when motion is given to the rotating vessel a portion of the fluid in it is forced in at the orifice of the stationary tube or vessel, and as the pressure of the fluid at the orifice is increased by an increase in the speed of rotation, the fluid rises higher in the stationary tube or vessel, and so the height of the fluid varies according to the speed of rotation given to the rotating vessel, and to the fluid contained in it.

In order to enforce and sustain the rotation of the fluid as completely as possible in conformity with that of the vessel, I provide internal projections, connected with or being part of the rotating vessel. In forming these projections I leave a space sufficient so that they may not interfere with the part which projects from the fixed tube or vessel.

It will be understood that the projections used for insuring the rotation of the liquid with the vessel insure, at the same time, the due pressure of the liquid at the orifice, and the equivalent rise of the fluid in the indicating tube or vessel. The height of the fluid so raised may represent, in conjunction with a scale, the number of revolutions (say, per minute) made either by the rotating vessel, or by the engine or body to which it is connected, and the speed of which it is desired to know. The scale may also be marked for the fluid to indicate miles or other measures per hour, when the instrument is to be used for indicating the speed of locomotive engines and carriages.

In some cases I use a glass tube as the indicating-tube, with scale attached. This tube may be straight, and may rise directly from the fixed tube or vessel which passes into the rotating vessel; or it may be bent downward after it rises from the fixed vessel, but so as to clear the rotating vessel, and then upward, the downward run being sufficiently low to allow of the liquid rising in the final upward run to the height of the level of the liquid in the rotating vessel when it is at rest, and so exhibit the starting or zero point from which the liquid rises. In some cases the tube may be made partly horizontal, or may be curved to any required extent. In some cases I use a larger tube, rising from the fixed tube or vessel, which passes into the rotating vessel. This larger tube may be of glass or of metal. In it I use a float connected with dial and pointer, or other equivalent indicating means. The rise or fall of the liquid in the tube will, in this case, operate the float, and so cause the indication of speed by means of the pointer on the divided dial.

I also employ a float with means attached to indicate the height of the fluid in the stationary tube or vessel, and, consequently, the speed of rotation of the rotating vessel, or otherwise, as before explained, of the machine, engine, or body connected with it, when it is desired to register or record continuously or otherwise the rate of motion or number of revolutions (say, per minute) made or being made by the rotating vessel, or the machine, engine, or other body connected with it. In such case I employ a time-piece, arranged, in connection with my speed-indicator, so as to present to a pencil actuated by the float ruled paper, on which a diagram is drawn through the combined actions of the time-piece and the float, which diagram forms, in the usual manner, a register of the speed of the rotating vessel, or of the machine, or engine, or body the speed of which it is desired to register. The ruled paper on which the register is made may be placed on a drum or cylinder of ordinary construction, which is turned by the time-piece, while the pencil is moved by the float in a direction parallel to the axis of the cylinder; or another well-known arrangement may be used, consisting of a dial or disk of paper ruled in concentric circles and radiating lines, and caused to turn by a time-piece, while the pencil, in connection with the float, may operate on a line from the circumference toward the center of the disk or dial. In this case the radiating ruled lines will represent time, and the concentric circles will represent the speed of rotation. If preferred, the clock-movement may be arranged to work the pencil; or it may work a pointer to pierce the paper, the paper being moved by the float. Mercury, water, or other suitable fluid may be used for my speed-indicator.

The rotating vessels for my improved speed-indicators may be made cylindrical, or of other suitable form, and may be furnished with a cover, or otherwise may be constructed in two convenient parts, securely fixed together, to prevent the escape of the liquid at their junction; and when a fixed central tube or vessel passes through a hole in the cover or upper part of the rotating vessel, and, further, when this tube or vessel is firmly supported by a bracket or frame, it may be fitted to the hole in the cover or upper part of the rotating vessel, and form a bearing or support to steady the vessel in its revolutions.

In order that my said invention may be most fully understood and readily carried into effect, I will proceed to describe the drawings hereunto annexed.

Figure 1:
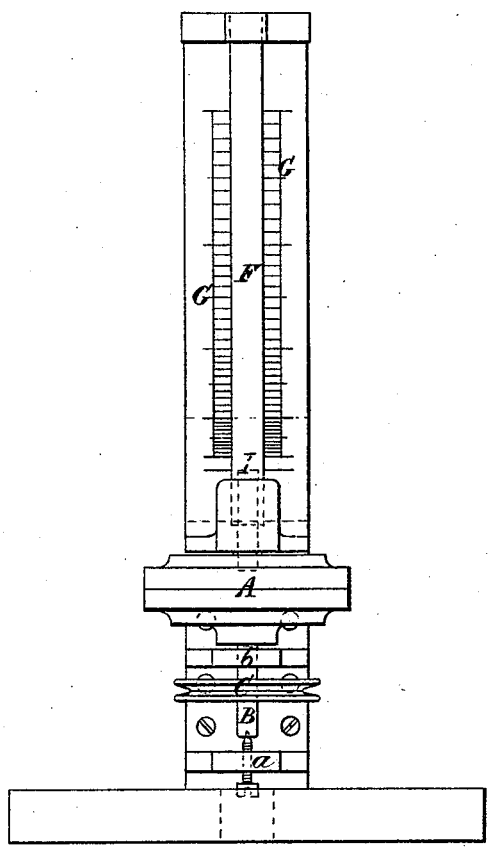
Figure 3:
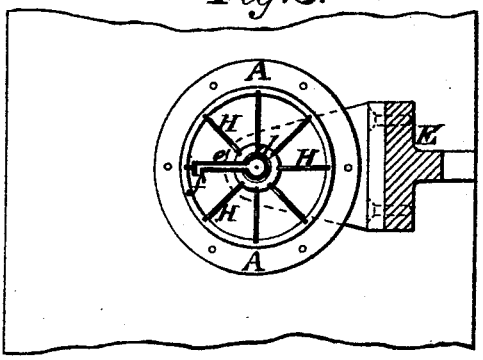

Figure 1 is an elevation, Fig. 2 a vertical section, and Fig. 3 a horizontal section, of one arrangement of my speed-indicator.

The vessel A contains the fluid. The spindle B is fixed to the lower portion of the vessel A, and on it is a pulley, C, by which it may be rotated. The spindle B is pivoted in a bearing at a. An upper bearing is provided at b. The small holes c c serve to admit the air into the vessel, as the fluid is forced out of it upward into the indicating glass tube F, and the radial projections H H serve to compel the liquid to rotate with the vessel A. The fixed tube or vessel d is attached to the upper or bracket part of the frame E, to which it is secured. The hollow arm e projects from the tube d, and has its orifice at f. Through this orifice the fluid finds its level in the tube d when the vessel A is at rest. When motion is given to the vessel A a portion of the fluid in the vessel is forced in at the orifice f, and so into the tube d, and upward (according to the speed of rotation) into the indicating glass tube F. I is a float resting on the liquid. It is of such a length as to be visible in the tube F when its upper end is at the zero-point m of the scale, when the apparatus is at rest.

The scale G may be marked for reading off the result in miles, quantities, revolutions of the instrument itself, or the equivalent revolutions of any machine or body to which it may be connected, and should be divided according to such circumstances, and in accordance with the rise of the fluid attained by the speed of rotation employed. The length of the indicating-tube F should be suited to the full range of indication desired, or to the highest speed at which it is intended to rotate the vessel A.

Fig. 4 is an elevation, partly in section, of an apparatus similar in the main to that shown in Figs. 1, 2, 3. Here, in case of the intended highest speed being accidentally exceeded, a reservoir, F', is provided to prevent the overflow of the fluid. The lower end of the tube F is fitted and cemented into the socket g, which is screwed into the bracket part of frame E. A band, h, encircles the head of socket g, and the scale G is attached to it for support. H are internal projections (which, in this instance, are indicated as forming part of the vessel A) for enforcing and sustaining the rotation of the fluid in conformity with that of the vessel, and causing it to pass into the orifice f. The space i leaves room for the passage of the arm e. Fig. 5 represents Fig. 4 in plan at line Z Z.

Fig. 6 represents the arrangement of my speed-indicator in which a larger fixed tube is employed, and in which larger tube is placed a float in connection with dial and pointer. This figure also illustrates a means by which the rise of the float may communicate its action to a pencil to effect the recording of such action by diagram upon a paper-covered cylinder moved by clock-work, after the manner of certain recording-instruments already well known. In this figure the spindle B of vessel A is shown supported by two bearings, a and a', placed below it, and the upper part of vessel A in this case, as in Figs. 1, 2, 3, is free, and does not touch the fixed tube or vessel d, the upper part of which is marked F.

The air has free entrance to the vessel A through the space allowed by the difference of diameters between the fixed tube d and the hole in the top of the vessel A.

I is the float, which, when the vessel A is rotated, is caused to rise by the forcing of the fluid into the orifice $f$, as explained in respect to Figs. 1, 2, and 3.

Float I is connected by cord with pencil-slide J, which acts as a weight to keep the cord under tension and cause it to turn the pulley K, which is fast on the spindle upon which the pointer $j$ is placed. It will thus be seen that the pointer is moved in accordance with the movements of the float I. It will also be seen that the pencil-slide J, owing to its connection with the float I, will move in accordance with it, and trace its rise and fall upon the paper on the cylinder L, which may be connected with clock-work so as, at the same time, to turn on its axis at any desired rate.

Fig. 7 shows a means by which, if desired, the unequal rise of the fluid, operating upon a float in the manner shown in Fig. 6, may be compensated for on the scale or dial, so that the pointer may travel through nearly the same space for every equal number of rotations of the vessel A, and that, consequently, the divisions on the dial may be made equal, or nearly so. In this, as in Fig. 6, the action of the float is supposed to be communicated to pulley K, which is fixed to spindle $k$. On this spindle is also fixed the cam $l$, which, when it is turned in the direction of the arrow by the rising of the float, will allow the slide $m$ (to which a small roller is attached and arranged to act on the cam) to fall. If the cam $l$ is accurately formed, the slide $m$ will fall through an equal space for each equal number of revolutions of the vessel A; and as the rack $m^1$ on slide $m$ gears with pinion $m^2$, fixed to the pointer-spindle, the movement of the slide $m$ is communicated to the pointer. $n\ n$ are supports for the dial, and form guides for the slide $m$, which has a long opening to allow the spindle $k$ to pass.

Fig. 8 shows an arrangement in which the float I is raised above the vessel A, so that, until the vessel A has attained to given speed of rotation, (during which time the fluid is rising in the fixed tube $d$,) the float I remains at rest. When, however, the speed of rotation is increased, the float is acted upon until it is raised in the tube or cylinder F. In this case the float is shown to operate by rack and pinion, for indicating the extent of the motion, the effect of the motion of the float I being increased by the difference of diameters of the pinion and the drum or pulley K, to which latter a cord for transmitting the motion to an indicating or recording apparatus is shown attached. $n$ is a tube, which may be applied, when desired, to restrict the height to which the float may be raised in case of an accidental excessive speed of rotation. In such case the fluid will escape through the tube $n$, and will fall into the receiver $n^1$, and so, through openings $n^2$, will return into the vessel A.

The cylinder or tube F is supported on a portion of a fixed frame, E, to which also the center tube $d$ is fixed. It will be understood that by this arrangement, not permitting the rise of the fluid to actuate the float until a certain speed of rotation has been acquired, the range of indication or registration may be confined between any ranges of speed, as may be desired.

Figs. 9 and 10 show the internal projections H, fixed into a center boss. One boss, $p$, with its eight blades, is screwed to the upper part of vessel A, and another, $p'$, to the lower. Vessel A, in these figures, is somewhat varied in form. The boss $p$ has a hole in its center, to allow of the passage of the fixed center tube or vessel, which is not indicated in these figures. Passages $c\ c$ are provided for the entrance and exit of air. Fig. 11 serves to illustrate more fully the means by which the zero or starting point can be brought into view. In the indicating-tube F is a float, I, long enough, so that its upper part is in view when the vessel A is at rest.

When motion is given to the vessel the float will be raised, its upper surface being read against a scale suitably fixed and graduated. The glass tube F is cemented into the fixed tube or vessel $d$. In Fig. 1 also a float, I, is provided.

Figs. 12, 13, 14, 15, 16, 17, 18, and 19 represent various forms of projecting arms and orifices. In each figure, $d$ is the central fixed tube or vessel, $e$ the hollow arm, and $f$ the orifice.

In Figs. 16 and 17 the hollow arm $e$ is shown projecting from the circular disk $e'$, which operates to prevent the action of the full length of the arm against the fluid.

In Figs. 16 and 17 a means is shown of reversing the orifice $f$ from one side of the hollow arm to the other, in order that when desired the vessel containing the fluid may be rotated in either direction. The reversing of the orifice $f$ is obtained by the cylindrical valve $q$, which fits freely in the tube $r$. This valve takes its position on one side or the other of the hollow in the arm $e$, according to the direction in which the fluid is moved. The pins $s$ form stops for the valve $q$.

In Figs. 18 and 19, $d$ is the central tube, $e$ the projecting arm, and $f$ the orifice. These last figures represent a small size arm and orifice. The sizes of the fixed center tubes, the projecting arms, and orifices will depend upon the size of the instrument and the use for which it is destined.

The disk $e'$, in Figs. 16 and 17, may be used or not, as preferred, in conjunction with any of the forms of projecting arms $e$ shown.

In indicating the similar parts in the various figures I have endeavored to use similar letters of reference in order to render it unnecessary to repeat the explanation of such parts.

My rotating vessels may be filled with the fluid, or may sometimes be only partially filled. It will generally be found advantageous to fill or nearly fill them, more especially when they serve for speed-indicators arranged to indicate from zero.

In arranging the drawings, which illustrate my invention, I have supposed mercury to be the fluid used.

I have shown my speed-indicators with open top indicating glass tubes, so that the upward rise of the fluid may not be impeded by the air in the tube; but, when preferred, as in the case of a shorter and more equally graduated scale being desired, these tubes may be closed at the top and the scale suitably graduated. In such cases a reservoir for air of suitable size may be placed at the top of the tube, so that the rise of the fluid will be checked to the desired extent by the resistance of the air in the tube and reservoir.

As errors in the indications may arise under this arrangement, owing to the expansion and contraction of the air, according to temperature, a cock or other means may be provided to equalize, when desired, the pressure of the air in the tube and reservoir to that of the outer air.

The indicator-tube, when closed at the end, may be placed horizontally or at an angle, and may be straight or spiral, the scale being graduated suitably.

In place of using a glass indicating-tube with closed end, in which the position of the fluid is read by a scale, an ordinary pressure-gage may, in some cases, be employed, attached to the central tube or vessel $d$, so as to be operated upon by air compressed by the force imparted to the fluid, according to the speed of rotation. In such case the dial-plate of the pressure-gage should be suitably graduated for speed. More than one orifice, $f$, may be used when desired, connected with the center fixed tube or vessel $d$.

Having thus described the nature of my said invention, and the manner of performing the same, I would have it understood that I do not claim the mechanical parts separately; but

I claim—

1. A speed-indicator constructed substantially as hereinbefore set forth, having a rotating vessel adapted to contain and carry round with it mercury or other liquid, and force the liquid into an orifice in a stationary arm supported within the rotating vessel, and through a channel leading from the orifice to a tube or vessel, in which, by virtue of the pressure of the liquid at the orifice, increasing with the speed of rotation of the vessel, it serves to indicate, or operates apparatus which will indicate, the speed of the rotating vessel, or other body or thing connected with it, substantially as herein described.

2. The combination, substantially as hereinbefore set forth, of the supporting-frame, the vessel mounted so as to rotate freely therein, and provided with internal projections and a passage to admit air, the indicating-tube, and the hollow arm projecting into the vessel, and having an orifice at or near its end, into which the liquid in the vessel is caused forcibly to enter by the internal projections as the vessel is revolved.

3. The combination of the supporting-frame, the rotating vessel, the indicating-tube, the fixed central tube or vessel connected at top with the indicating-tube, and the laterally-projecting hollow arm connected at its upper end with said central tube, and having an orifice at its opposite end, these members being constructed and operating substantially as hereinbefore set forth.

4. The combination of the rotating vessel, the stationary tube or vessel projecting upward therefrom, the hollow arm connected with said tube, and having a two-way orifice in its outer end, and the valve in said orifice, these members being constructed and operating substantially as hereinbefore set forth, whereby the liquid in the vessel passes to the hollow arm on one side or the other, according to the direction of rotation of the vessel.

JAMES M. NAPIER.

Witnesses:
WILMER M. HARRIS,
JNO. DEAN,
Both of No. 17 Gracechurch Street, London.